United States Patent
Ota

(10) Patent No.: US 11,611,731 B2
(45) Date of Patent: *Mar. 21, 2023

(54) EVALUATION METHOD FOR IMAGE PROJECTION SYSTEM, IMAGE PROJECTION SYSTEM, AND IMAGE PROJECTION CONTROL APPARATUS

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,012

(22) Filed: Jun. 15, 2021

(65) Prior Publication Data

US 2021/0392311 A1  Dec. 16, 2021

(30) Foreign Application Priority Data

Jun. 16, 2020 (JP) .............................. JP2020-103697

(51) Int. Cl.
  *H04N 9/31* (2006.01)
(52) U.S. Cl.
  CPC ......... *H04N 9/3194* (2013.01); *H04N 9/3147* (2013.01)
(58) Field of Classification Search
  CPC .. H04N 9/3147; H04N 9/3182; H04N 9/3185; H04N 9/3194; H04N 9/3191
  See application file for complete search history.

(56) References Cited

U.S. PATENT DOCUMENTS

| | | | |
|---|---|---|---|
| 8,994,757 B2 | 3/2015 | Surati et al. | |
| 10,802,384 B2 | 10/2020 | Kaji et al. | |
| 2006/0187299 A1 | 8/2006 | Miyazawa | |
| 2012/0050698 A1* | 3/2012 | Kotani | H04N 9/3147 353/94 |
| 2013/0208008 A1 | 8/2013 | Otera et al. | |
| 2013/0342816 A1 | 12/2013 | Furui | |

(Continued)

FOREIGN PATENT DOCUMENTS

| | | |
|---|---|---|
| JP | 2006-245737 A | 9/2006 |
| JP | 2012-047849 A | 3/2012 |

(Continued)

OTHER PUBLICATIONS

Feb. 10, 2022 Notice of Allowance Issued in U.S. Appl. No. 17/354,919.

*Primary Examiner* — Brian P Yenke
*Assistant Examiner* — Humam M Satti
(74) *Attorney, Agent, or Firm* — Oliff PLC

(57) ABSTRACT

An evaluation method for an image projection system in which a first projector, a second projector, and a third projector perform stack projection on a screen, the method including acquiring a first image generated by capturing the screen at a first timing, acquiring a second image generated by capturing the screen at a second timing, causing the projection state of the first projector to differ from the projection states of the second projector and the third projector at the first timing, and evaluating whether or not the first projector needs to be adjusted based on the first image and the second image.

7 Claims, 12 Drawing Sheets

(56) References Cited

U.S. PATENT DOCUMENTS

| | | | |
|---|---|---|---|
| 2014/0226028 A1* | 8/2014 | Wright | H04N 9/3185 |
| | | | 348/189 |
| 2015/0029465 A1* | 1/2015 | Ishikawa | G06T 3/005 |
| | | | 353/30 |
| 2017/0103687 A1 | 4/2017 | Ano | |
| 2017/0127028 A1 | 5/2017 | Oike et al. | |
| 2017/0208309 A1 | 7/2017 | Oike et al. | |
| 2018/0063494 A1 | 3/2018 | Tanabe | |
| 2018/0084234 A1 | 3/2018 | Yamamoto et al. | |
| 2018/0150273 A1 | 5/2018 | Tomita | |
| 2018/0151098 A1 | 5/2018 | Tomita | |
| 2018/0324396 A1* | 11/2018 | Ishikawa | H04N 9/3194 |
| 2018/0367768 A1 | 12/2018 | Nobori | |
| 2019/0033985 A1 | 1/2019 | Ano | |
| 2019/0166336 A1 | 5/2019 | Shindo | |
| 2019/0265847 A1 | 8/2019 | Ano | |
| 2020/0077063 A1 | 3/2020 | Yamasaki | |
| 2020/0159483 A1 | 5/2020 | Yoshihara | |
| 2020/0389630 A1 | 12/2020 | Fujimori et al. | |
| 2020/0413015 A1 | 12/2020 | Asai et al. | |
| 2021/0035315 A1 | 2/2021 | Ota | |
| 2021/0037221 A1 | 2/2021 | Kudo et al. | |
| 2021/0136339 A1 | 5/2021 | Kashiwagi et al. | |
| 2021/0168341 A1 | 6/2021 | Kubota | |
| 2021/0235050 A1 | 7/2021 | Shishido | |
| 2021/0368150 A1 | 11/2021 | Kubota | |
| 2021/0392311 A1 | 12/2021 | Ota | |

FOREIGN PATENT DOCUMENTS

| | | |
|---|---|---|
| JP | 2013-055505 A | 3/2013 |
| JP | 2014-007517 A | 1/2014 |

\* cited by examiner

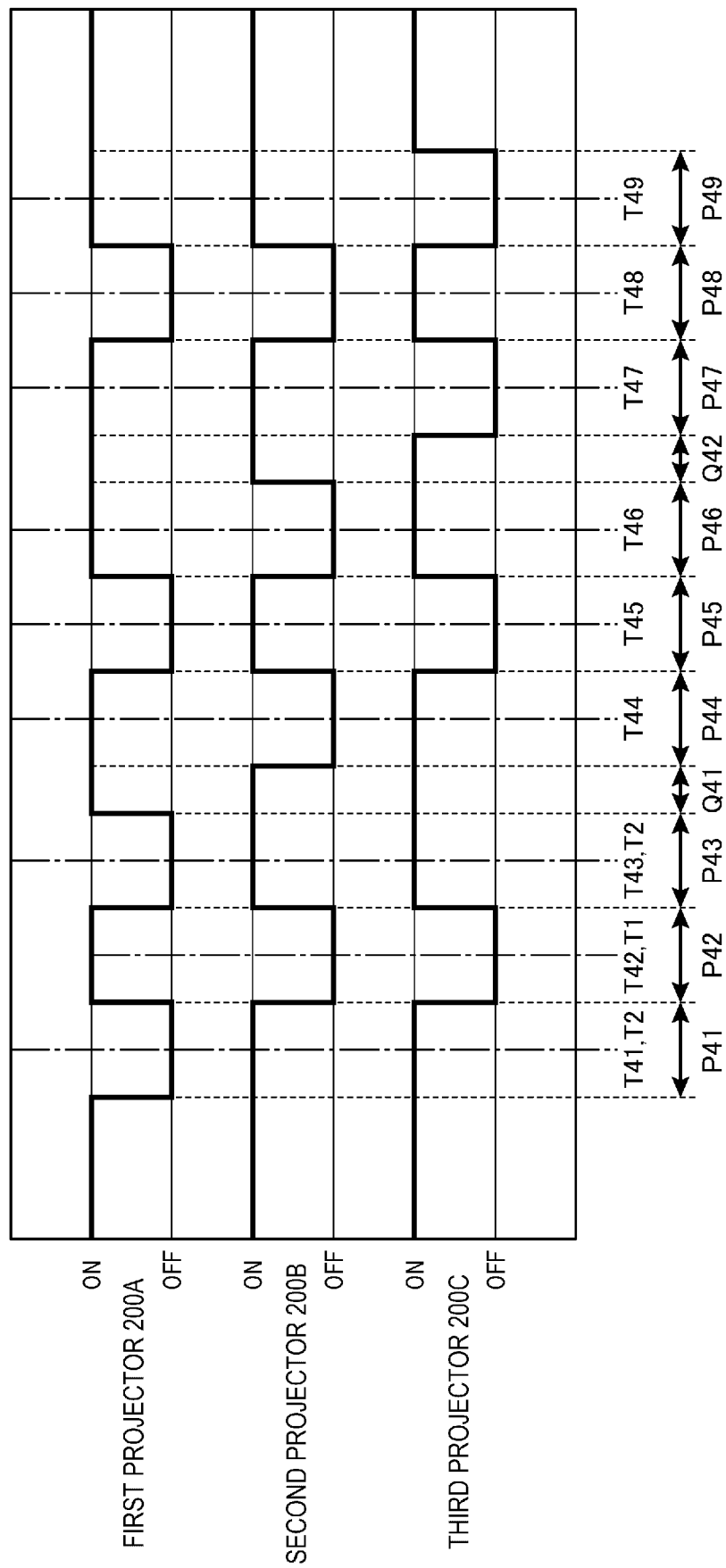

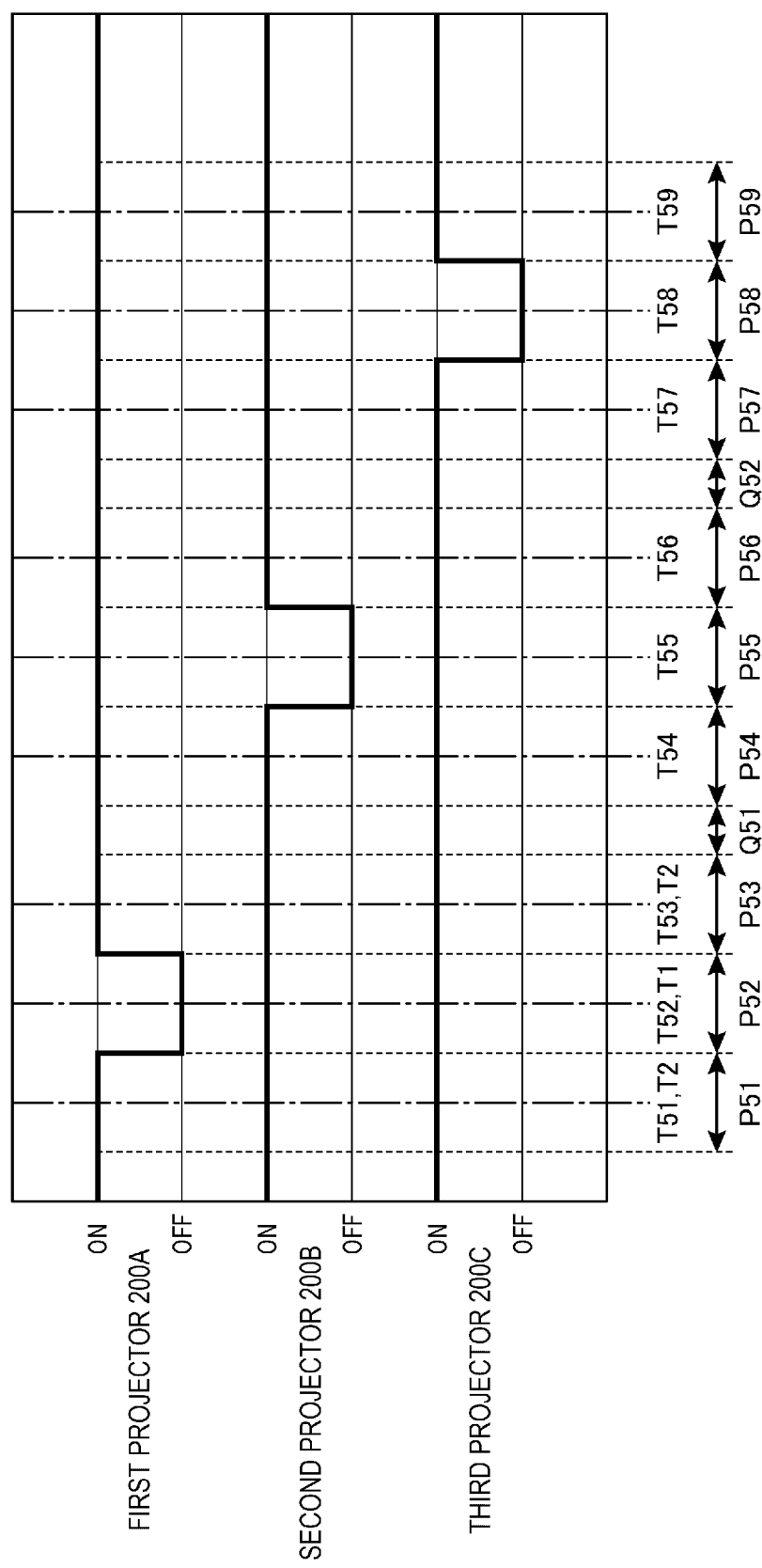

EVALUATION METHOD FOR IMAGE PROJECTION SYSTEM, IMAGE PROJECTION SYSTEM, AND IMAGE PROJECTION CONTROL APPARATUS

The present application is based on, and claims priority from JP Application Serial Number 2020-103697, filed Jun. 16, 2020, the disclosure of which is hereby incorporated by reference herein in its entirety.

BACKGROUND

1. Technical Field

The present disclosure relates to an evaluation method for an image projection system, an image projection system, and an image projection control apparatus.

2. Related Art

There is a known technology relating to what is called "stack projection" in which images projected from a plurality of projectors are superimposed on one another (see JP-A-2014-7517, for example).

JP-A-2014-7517 describes that the position of a measurement pattern projected by a second projector is compared with the position of a measurement pattern projected by a first projector to adjust the position of video images projected by the second projector.

In the state in which the plurality of projectors perform the stack projection, however, it is difficult to identify a projector projecting an image that needs to be adjusted out of the plurality of projectors because the projectors project images in the same area so that the images are superimposed on one another.

SUMMARY

An aspect that solves the problem described above relates to an evaluation method for an image projection system including acquiring a first image generated by capturing a projection area at a first timing, acquiring a second image generated by capturing the projection area at a second timing different from the first timing, causing a projection state of a first projector to differ from projection states of a second projector and a third projector at the first timing, and evaluating whether or not the first projector needs to be adjusted based on the first image and the second image, wherein the first projector, the second projector, and the third projector perform stack projection in the projection area.

Another aspect that solves the problem described above relates to an image projection system including a first projector, a second projector, and a third projector that perform stack projection in a projection area, a camera, and one or more processors programmed to acquire a first image generated by the camera that captures the projection area at a first timing, acquire a second image generated by the camera that captures the projection area at a second timing different from the first timing, cause a projection state of the first projector to differ from projection states of the second projector and the third projector at the first timing, and evaluate whether or not the first projector needs to be adjusted based on the first image and the second image.

Another aspect that solves the problem described above relates to an image projection control apparatus including one or more processors programmed to acquire a first image generated by a camera that captures a projection area at a first timing, acquire a second image generated by the camera that captures the projection area at a second timing different from the first timing, cause a projection state of a first projector to differ from projection states of a second projector and a third projector at the first timing, and evaluate whether or not the first projector needs to be adjusted based on the first image and the second image, wherein the image projection control apparatus communicably connected to the first projector, the second projector, the third projector, and the camera, and the first projector, the second projector and the third projector perform stack projection in the projection area.

BRIEF DESCRIPTION OF THE DRAWINGS

FIG. 11 is a timing chart showing an example of changes in the projection state in a fourth embodiment.

FIG. 12 is a timing chart showing an example of changes in the projection state in a fifth embodiment.

DESCRIPTION OF EXEMPLARY EMBODIMENTS

An embodiment according to the present disclosure will be described below with reference to the drawings.

The present embodiment includes a first embodiment described with reference to FIGS. 6 to 8, a second embodiment described with reference to FIG. 9, a third embodiment described with reference to FIG. 10, a fourth embodiment described with reference to FIG. 11 and a fifth embodiment described with reference to FIG. 12.

Figure 1:
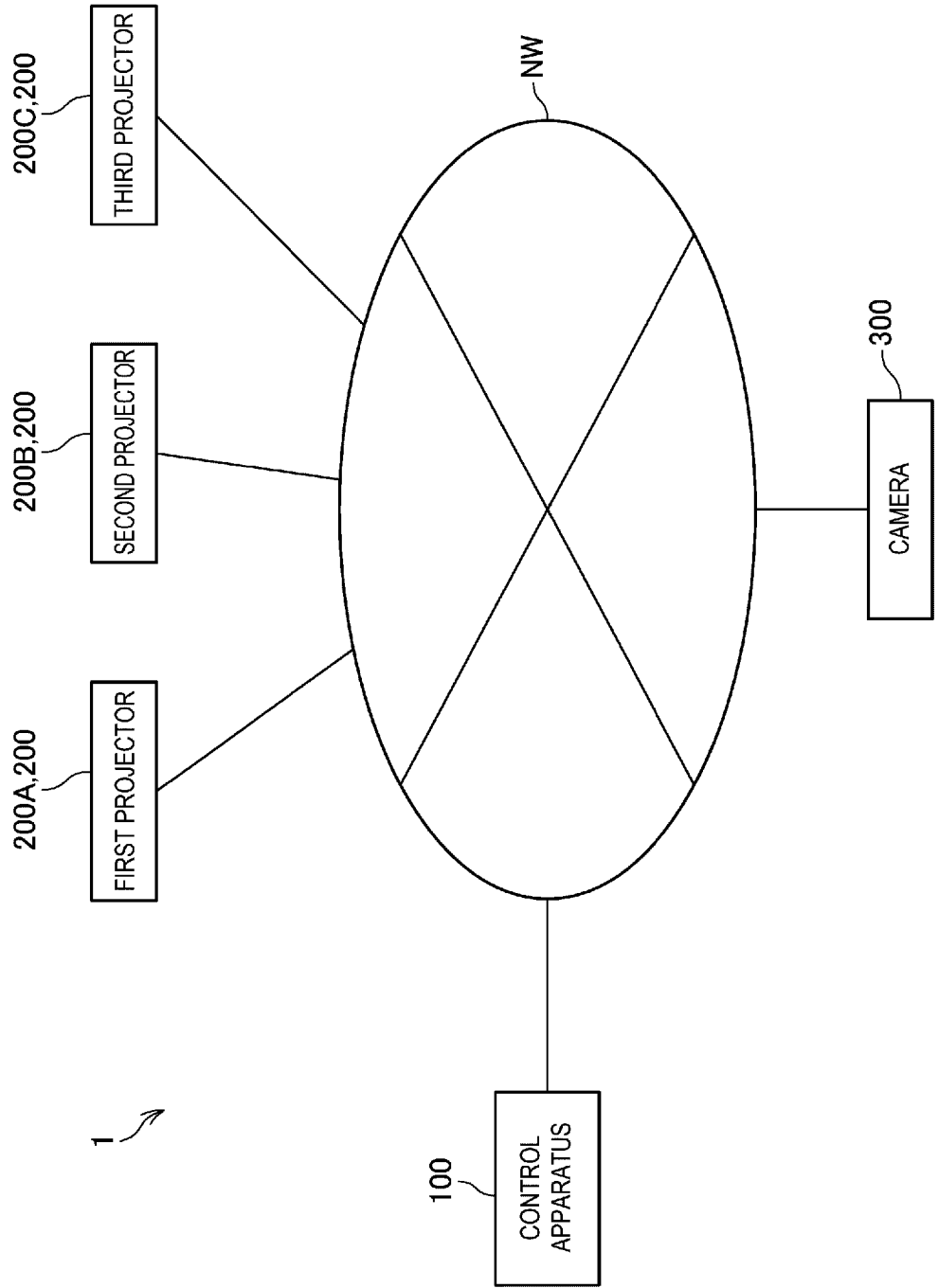
FIG. 1 shows an example of the configuration of an image projection system according to an embodiment of the present disclosure.

FIG. 1 shows an example of the configuration of an image projection system. 1 according to the present embodiment.

The image projection system 1 includes a control apparatus 100, a plurality of projectors 200, and a camera 300. The control apparatus 100 is communicably connected to each of the plurality of projectors 200 and the camera 300 via a network NW. The network NW is, for example, a LAN (local area network) and allows communication to be performed in accordance with the Ethernet (registered trademark) standard.

The image projection system 1 includes a first projector 200A, a second projector 200B, and a third projector 200C as the plurality of projectors 200.

The first projector 200A to the third projector 200C have substantially the same configuration.

In the following description, when it is not particularly necessary to distinguish the first projector 200A to the third projector 200C from one another, they are called the projectors 200 in some cases.

The present embodiment will be described with reference to the case where three projectors 200 form the image projection system 1, but four or more projectors 200 may form the image projection system 1.

The control apparatus 100 sets the positions of images projected by the first projector 200A to the third projector 200C in such a way that the images projected by the first projector 200A to the third projector 200C are superimposed on one another. In other words, the images projected by the first projector 200A to the third projector 200C undergo the stack projection.

The first projector 200A to the third projector 200C accept a user's operation and adjust the positions of the images projected by the projectors 200 in accordance with the user's operation. Specifically, the user adjusts the position of the image projected by each of the projectors 200, for example, by adjusting the position of the main body of the projector 200, adjusting lens shift, and adjusting zooming.

The control apparatus 100 switches the projection state of each of the first projector 200A to the third projector 200C between a projection-on state and a projection-off state. The projection-on state is a state in which an image is projected, and the projection-off state is a state in which no image is projected. In the projection-off state, the first projector 200A to the third projector 200C each display, for example, a solid black image.

The control apparatus 100 evaluates whether or not the first projector 200A to the third projector 200C each need to be adjusted. For example, the control apparatus 100 evaluates whether or not the color of an image projected by each of the first projector 200A to the third projector 200C needs to be adjusted.

The configuration of the control apparatus 100 will be described later with reference to FIGS. 3 and 5.

The control apparatus 100 corresponds to an example of an "image projection control apparatus."

In the present embodiment, the control apparatus 100 switches the projection state of each of the first projector 200A to the third projector 200C between the projection-on and the projection-off state and evaluates whether or not the color of the image projected by each of the first projector 200A to the third projector 200 needs to be adjusted, but the present disclosure is not limited to the configuration described above. For example, a second control section 250 of the first projector 200A, which will be described later with reference to FIG. 3, may switch the projection state of each of the first projector 200A to the third projector 200C between the projection-on state and the projection-off state and evaluate whether or not the color of the image projected by each of the first projector 200A to the third projector 200C needs to be adjusted.

In the present embodiment, the first projector 200A is coupled to each of the second projector 200B and the third projector 200C via the network NW, but the first projector 200A may instead be coupled to each of the second projector 200B and the third projector 200C in accordance with daisy-chain connection. For example, the first projector 200A is coupled to the second projector 200B via an HDMI (registered trademark) cable, and the second projector 200B is coupled to the third projector 200C via an HDMI cable.

Still instead, the first projector 200A may be configured to be wirelessly communicable with each of the second projector 200B and the third projector 200C in accordance, for example, with the Wi-Fi (registered trademark) standard.

The camera 300 generates a captured image by capturing an image of a stacked image formed on a screen SC by the first projector 200A to the third projector 200C that project images in the stack projection.

The screen SC will be described later with reference to FIG. 2.

The present embodiment will be described with reference to a case where the camera 300 is a component separate from the first projector 200A to the third projector 200C, but not necessarily. At least one of the first projector 200A to the third projector 200C may include a camera. For example, the second projector 200B may include a camera, and the camera of the second projector 200B may generate a captured image by capturing the stacked image formed on the screen SC.

Figure 2:
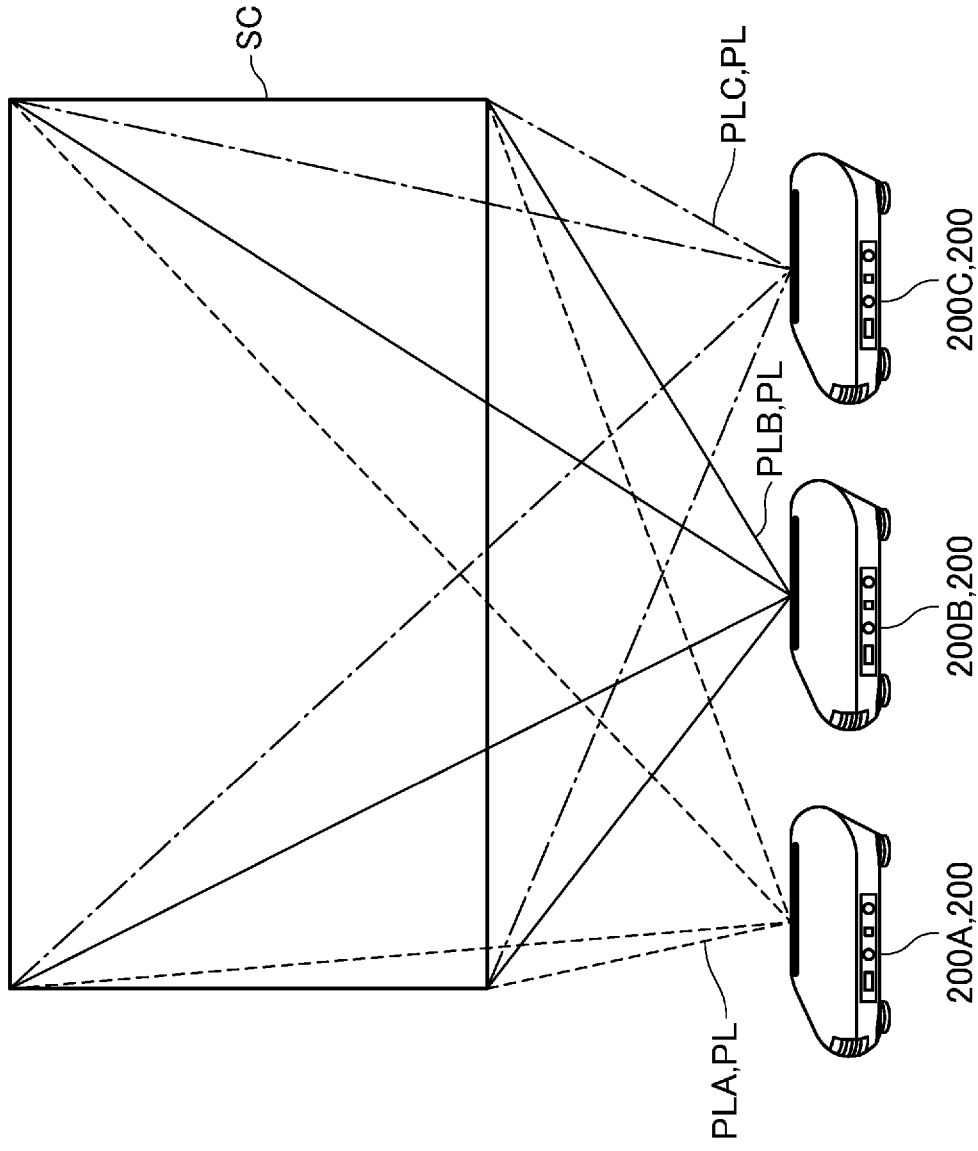
FIG. 2 is a perspective view showing an example of a projection state.

FIG. 2 is a perspective view showing an example of the projection states of the first projector 200A to the third projector 200C.

The first projector 200A to the third projector 200C are arranged, for example, in the rightward-leftward direction. In other words, the first projector 200A to the third projector 200C are arranged along the direction parallel to the screen SC.

The first projector 200A projects image light PLA on the screen SC. The second projector 200B projects image light PLB on the screen SC. The third projector 200C projects image light PLC on the screen SC.

The first projector 200A to the third projector 200C project the image light PLA to the image light PLC, respectively, in such a way that the image light PLA to the image light PLC are superimposed on one another on the screen SC.

The screen SC corresponds to an example of a "projection area."

The term "on the screen SC" corresponds to an example of the term "in a projection area."

When the image light PLA, the image light PLB, and the image light PLC are not distinguished from one another, they are called the image light PL in some cases.

Figure 3:
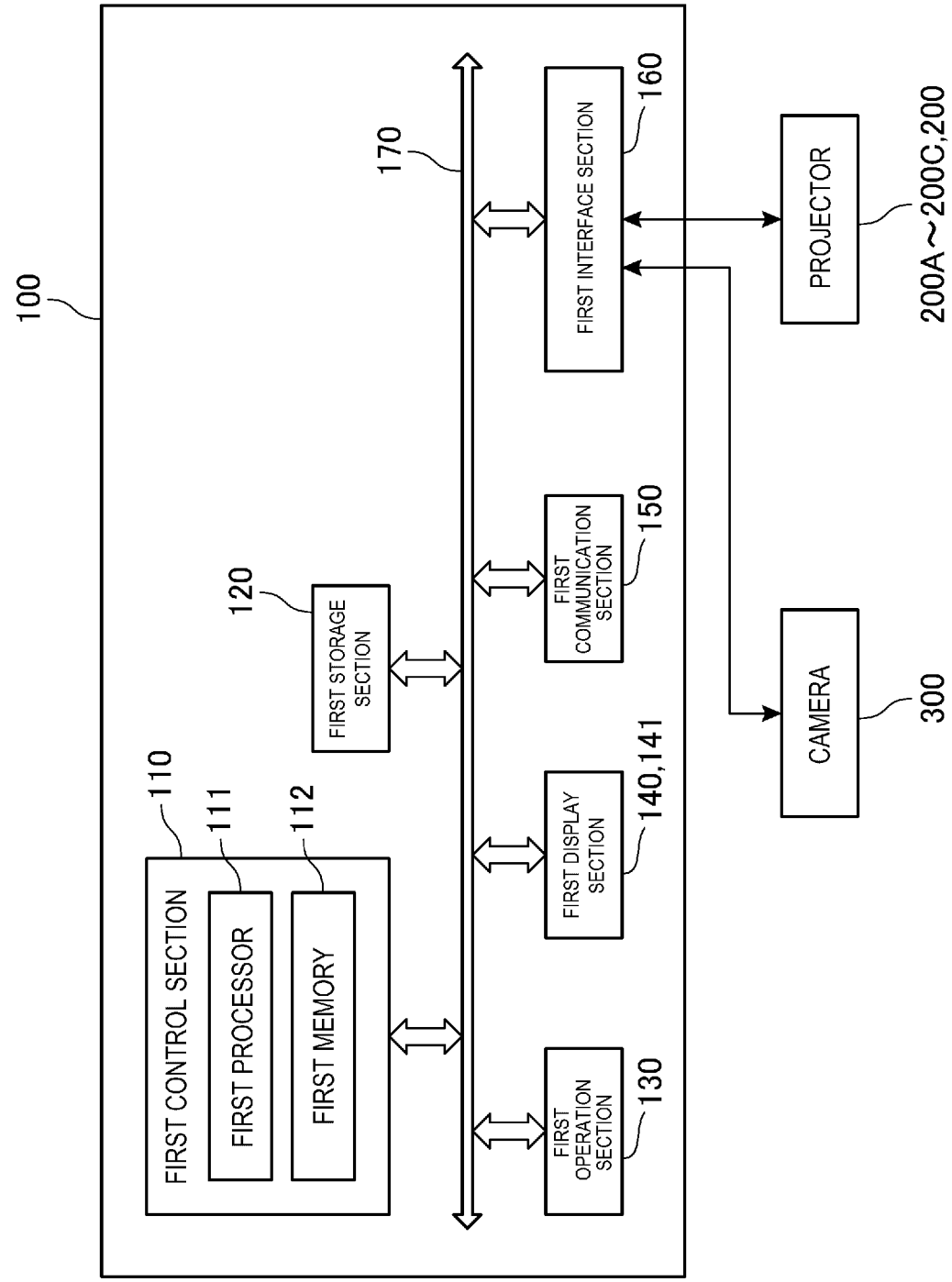
FIG. 3 shows an example of the configuration of a control apparatus according to the present embodiment.

FIG. 3 shows an example of the configuration of the control apparatus 100 according to the present embodiment.

The control apparatus 100 is communicably connected to the first projector 200A to the third projector 200C and the camera 300. The control apparatus 100 transmits data on an image to be projected on the screen SC, a variety of pieces of setting information, and a variety of pieces of instruction information to each of the first projector 200A to the third projector 200C. In the present embodiment, the control apparatus 100 is communicably connected to the first projector 200A to the third projector 200C and the camera 300 via the network NW.

The data on an image to be projected on the screen SC represents, for example, a pattern image transmitted from the control apparatus 100. The pattern image is, for example, a predetermined color solid image. The predetermined color is, for example, red, green, or blue.

In the present embodiment, the first projector 200A to the third projector 200C each project the pattern image on the screen SC, but not necessarily. The first projector 200A to the third projector 200C may each project on the screen SC, for example, an image generated by the control apparatus 100 that reproduces a content.

Further, in the present embodiment, the control apparatus 100 transmits data on an image to be projected on the screen SC to each of the first projector 200A to the third projector 200C, but not necessarily. An image supplier that is not shown may transmit data on an image to be projected on the screen SC to each of the first projector 200A to the third projector 200C. The image supplier is formed, for example, of a personal computer.

The control apparatus 100 is formed, for example, of a personal computer and includes a first control section 110, a first storage section 120, a first operation section 130, a first display section 140, a first communication section 150, and a first interface section 160.

The first storage section 120, the first operation section 130, the first display section 140, the first communication section 150, and the first interface section 160 are each coupled to the first control section 110 via a first internal bus 170.

The first control section 110 includes a first processor 111 and a first memory 112, and controls each portion of the control apparatus 100.

The memory 112 is a storage apparatus that stores in a nonvolatile manner a program executed by the processor 111 and data processed by the processor 111. The memory 112 is formed of a magnetic storage apparatus, a semiconductor storage device, such as a flash ROM (read only memory), or any other type of nonvolatile storage apparatus.

The first memory 112 may include a RAM (random access memory) that forms a work area used by the first processor 111. The first memory 112 stores data processed by the first control section 110 and a first control program executed by the first processor 111.

The processor 111 may be formed of a single processor, or a plurality of processors may function as the first processor 111. The first processor 111 executes the first control program to control each portion of the control apparatus 100.

The first storage section 120 stores in a nonvolatile manner a program executed by the first control section 110 and data processed by the first control section 110. The first storage section 120 is, for example, a magnetic recording apparatus, such as an HDD (hard disk drive), or a storage apparatus using a semiconductor storage device, such as a flash memory.

The first storage section 120 stores, for example, an operating system (OS) as a basic control program executed by the first control section 110 and an application program that operates on the OS as a platform. The first storage section 120 further stores, for example, data to be processed when the application program is executed and the processed data. The first storage section 120 still further stores the pattern images projected on the screen SC by the first projector 200A to the third projector 200C.

The first operation section 130 accepts the user's operation, generates an operation signal, and outputs the operation signal to the first control section 110. The first operation section 130 includes, for example, a keyboard and a mouse.

The first display section 140 includes a display panel 141, which displays a variety of images under the control of the first control section 110. The display panel 141 includes, for example, an LCD (liquid crystal display). The display panel 141 is formed in a rectangular shape. In the present embodiment, the display panel 141 has an oblong shape.

In the present embodiment, the display panel 141 is configured as a touch panel. That is, the display panel 141 is provided with a touch sensor that detects the position where a pen, the user's finger, or any other object comes into contact with the display panel 141.

The first communication section 150 is a communication interface that performs data communication with an external apparatus including the first projector 200A to the third projector 200C and the camera 300 and includes an interface circuit that processes signals to be transmitted and received. The first communication section 150 is, for example, a wireless communication interface corresponding to the Wi-Fi (registered trademark) standard.

The first interface section 160 is an interface communicably connected to the external apparatus including the first projector 200A to the third projector 200C and the camera 300. The first interface section 160 performs, for example, communication that complies with the Ethernet (registered trademark) standard. The first interface section 160 includes a connector to which an Ethernet (registered trademark) cable is connected and an interface circuit that processes a signal transmitted through the connector. The first interface section 160 is an interface substrate including the connector and the interface circuit and is coupled to a main substrate of the first control section 110 that is a substrate on which the processor and other components are mounted. The connector and the interface circuit that form the first interface section 160 are instead mounted on a main substrate of the control apparatus 100.

In the present embodiment, the first control section 110 transmits a variety of pieces of image information, a variety of pieces of setting information, and a variety of pieces of instruction information to each of the first projector 200A to the third projector 200C and the camera 300 via the first interface section 160, but not necessarily. The first control section 110 may instead transmit the variety of pieces of image information, the variety of pieces of setting information, and the variety of pieces of instruction information to each of the first projector 200A to the third projector 200C and the camera 300, for example, via the first communication section 150.

In other words, in the present embodiment, the first control section 110 transmits the variety of pieces of image information, the variety of pieces of setting information, and the variety of pieces of instruction information to each of the first projector 200A to the third projector 200C and the camera 300 by using wired communication, but the first control section 110 may instead transmit the variety of pieces of image information, the variety of pieces of setting information, and the variety of pieces of instruction information to each of the first projector 200A to the third projector 200C and the camera 300 by using wireless communication.

In the present embodiment, the control apparatus 100 is formed of a personal computer, but the control apparatus 100 may instead be formed, for example, of a tablet terminal or a smartphone.

Figure 4:
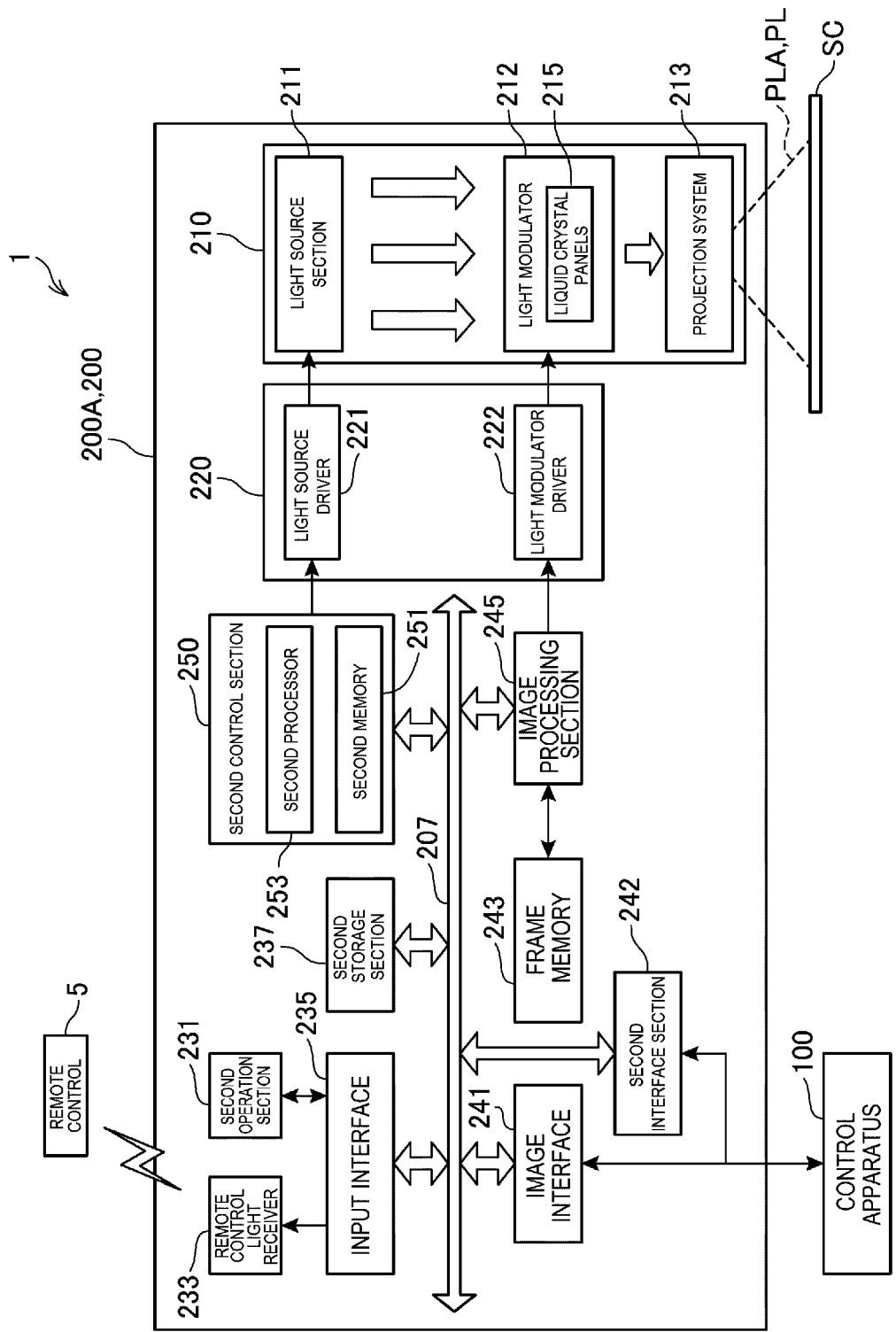
FIG. 4 shows an example of the configuration of a projector.

FIG. 4 shows an example of the configuration of the first projector 200A.

The first projector 200A to the third projector 200C have substantially the same configuration. Therefore, the configuration of the first projector 200A will be described with reference to FIG. 4, and the configuration of each of the second projector 200B and the third projector 200C will not be described.

The first projector 200A includes a projection section 210 and a drive section 220, which drives the projection section 210. The projection section 210 forms an optical image and projects the image on the screen SC. In the present embodiment, the projection section 210 projects the pattern image corresponding to the image data from the control apparatus 100 on the screen SC.

The projection section 210 includes a light source section 211, an optical modulator 212, and a projection system 213. The drive section 220 includes a light source driver 221 and a light modulator driver 222.

The light source section 211 includes a lamp, such as a halogen lamp, a xenon lamp, and an ultrahigh-pressure mercury lamp, or a solid-state light source, such as an LED (light emitting diode) and a laser light source.

The light source section 211 may include a reflector and an auxiliary reflector that guide the light outputted from the light source to the light modulator 212. The light source section 211 may further include, for example, the following optical elements for enhancing the optical characteristics of the projection light: a lens group; a polarizer; and a light adjusting element that is disposed in the path to the light modulator 112 and attenuates the amount of light outputted by the light source.

The light source driver 221 is coupled to a second internal bus 207 and turns on and off the light source of the light source section 211 in accordance with an instruction from the second control section 250 coupled to the second internal bus 207.

The light modulator 212 includes, for example, three liquid crystal panels 215 corresponding to the three primary colors, R, G, and B. The characters R, G, and B represent red, green, and blue, respectively. That is, the light modulator 212 includes a liquid crystal panel 215 corresponding to the R light, a liquid crystal panel 215 corresponding to the G light, and a liquid crystal panel 215 corresponding to the B light.

The light outputted by the light source section 211 is separated into three color light fluxes or the R light, the G light, and the B light, which enter the liquid crystal panels 215 corresponding thereto. The three liquid crystal panels 215 are each a transmissive liquid crystal panel and each modulate the light flux passing therethrough to produce the image light PLA. The image light PLA having passed through each of the liquid crystal panels 215 and having therefore been modulated is combined with the image light PLA having passed through the other liquid crystal panels 215 by a light combining system, such as a cross dichroic prism, and the combined image light PLA exits toward the projection system 213.

The present embodiment will be described with reference to the case where the light modulator 212 includes the transmissive liquid crystal panels 215 as light modulation devices, but not necessarily. The light modulation devices may each be a reflective liquid crystal panel or a digital micromirror device.

The light modulator 212 is driven by the light modulator driver 222. The light modulator driver 222 is coupled to an image processing section 245.

Image data corresponding to the RGB primary colors are inputted from the image processing section 245 to the light modulator driver 222. The light modulator driver 222 converts the inputted image data into data signals suitable for the action of the liquid crystal panels 215. The light modulator driver 222 applies voltage to each pixel of each of the liquid crystal panels 215 based on the data signals as a result of the conversion to draw an image in the liquid crystal panel 215.

The projection system 213 includes a lens, a mirror, and other components that bring the incident image light PL into focus on the screen SC. The projection system 213 may further include, for example, a zoom mechanism that enlarges or reduces an image to be projected on the screen SC and a focus adjustment mechanism that performs focus adjustment.

The first projector 200A further includes a second operation section 231, a remote control light receiver 233, an input interface 235, a second storage section 237, an image interface 241, a second interface section 242, a frame memory 243, the image processing section 245, and the second control section 250. The input interface 235, the second storage section 237, the image interface 241, the second interface section 242, the image processing section 245, the second control section 250 are coupled to each other via the second internal bus 207 so as to be capable of data communication.

The second operation section 231 includes a variety of buttons and switches provided at the surface of the enclosure of the first projector 200A, generates an operation signal corresponding to operation performed on any of the buttons and switches, and outputs the generated operation signal to the input interface 235. The input interface 235 includes a circuit that outputs the operation signal inputted from the second operation section 231 to the second control section 250.

The remote control light receiver 233 receives an infrared signal transmitted from a remote control 5 and decodes the received infrared signal to generate an operation signal. The remote control light receiver 233 outputs the generated operation signal to the input interface 235. The input interface 235 outputs the operation signal inputted from the remote control light receiver 233 to the second control section 250.

The second storage section 237 is, for example, a magnetic recording apparatus, such as an HDD, or a storage apparatus using a semiconductor storage device, such as a flash memory. The second storage section 237 stores, for example, a program executed by the second control section 250, data processed by the second control section 250, and image data.

The image interface 241 includes a connector and an interface circuit and is configured to be coupled via a wire to the control apparatus 100, which supplies the first projector 200A with image data. The image interface 241 is, for example, a communication interface that performs communication with the control apparatus 100 in accordance with the Ethernet (registered trademark) standard. The image interface 241 receives the image data from the control apparatus 100.

The second interface section 242 is a communication interface that performs communication with the control apparatus 100 in accordance with the Ethernet (registered trademark) standard. The second interface section 242 includes a connector to which an Ethernet (registered trademark) cable is connected and an interface circuit that processes a signal transmitted via the connector. The second interface section 242 is an interface substrate including the connector and the interface circuit and is coupled to a main substrate of the second control section 250 that is a substrate on which a second processor 253 and other components are mounted. The connector and the interface circuit that form the second interface section 242 are instead mounted on the main substrate of the second control section 250. The second interface section 242 receives, for example, the variety of pieces of setting information and the variety of pieces of instruction information from the controller 100.

The second control section 250 includes a second memory 251 and the second processor 253.

The second memory 251 is a storage apparatus that stores a program executed by the second processor 253 and data processed by the second processor 253 in a nonvolatile manner. The second memory 251 is formed of a magnetic storage apparatus, a semiconductor storage device, such as a flash ROM, or any other nonvolatile storage apparatus. The second memory 251 may include a RAM that forms a work area used by the second processor 253. The second memory 251 stores data processed by the second control section 250 and a second control program executed by the second processor 253.

The second processor 253 may be formed of a single processor, or a plurality of processors may function as the second processor 253. The second processor 253 executes the second control program to control each portion of the first projector 200A. For example, the second processor 253 outputs an instruction of execution of image processing corresponding to operation accepted by the second operation section 231 or the remote control 5 and parameters used in the image processing to the image processing section 245. The parameters include, for example, a geometric correction parameter for correcting geometric distortion of an image to be projected on the screen SC. The second processor 253 further controls the light source driver 221 to control the operation of turning on and off the light source section 211 and adjust the luminance of the light from the light source section 211.

The image processing section 245 and the frame memory 243 can be formed, for example, of an integrated circuit. The integrated circuit includes an LSI, an ASIC (application specific integrated circuit), and a PLD (programmable logic device). The PLD includes, for example, FPGA (field-programmable gate array). An analog circuit may form part of the configuration of the integrated circuit, or the combination of a processor and an integrated circuit may be used. The combination of a processor and an integrated circuit is called, for example, a microcontroller (MCU), a SoC (System-on-a-chip), a system LSI, and a chipset.

The image processing section 245 develops the image data inputted via the image interface 241 in the frame memory 243. The frame memory 243 includes a plurality of banks. The banks each have storage capacity that allows image data corresponding to one frame to be written to the bank. The frame memory 243 is formed, for example, of an SDRAM (synchronous dynamic random access memory).

The image processing section 245 performs image processing on the image data developed in the frame memory 243, for example, resolution conversion or resizing, distortion correction, shape correction, digital zooming, and image color tone and brightness adjustment.

The image processing section 245 converts an input frame frequency of the vertical sync signal into a drawing frequency and generates a vertical sync signal having the drawing frequency. The generated vertical sync signal is called an output sync signal. The image processing section 245 outputs the generated output sync signal to the light modulator driver 222.

Figure 5:
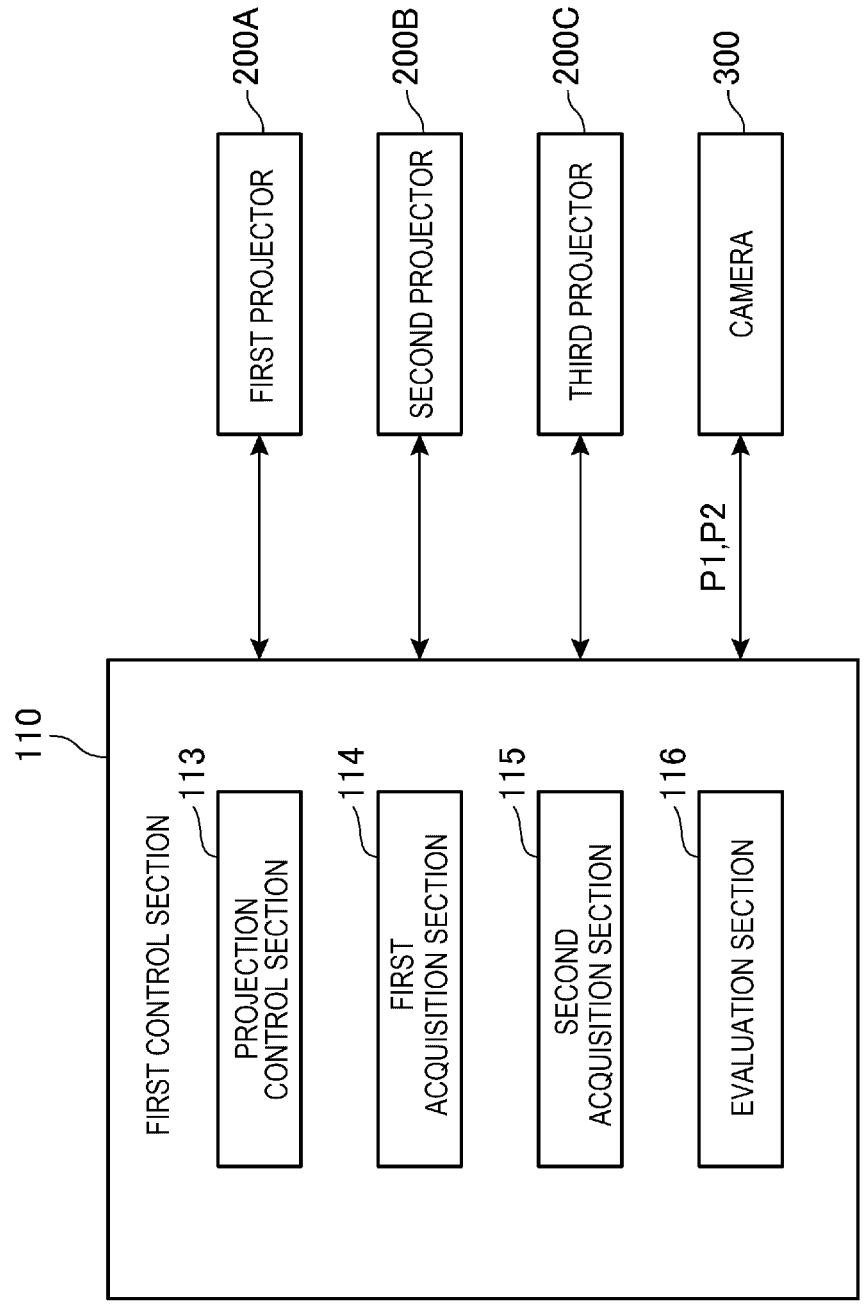
FIG. 5 shows an example of the configuration of a first control section of the control apparatus according to the present embodiment.

FIG. 5 shows an example of the configuration of the first control section 110 of the control apparatus 100 according to the present embodiment.

The first control section 110 of the control apparatus 100 includes a projection control section 113, a first acquisition section 114, a second acquisition section 115, and an evaluation section 116. Specifically, the first processor 111 of the first control section 110 executes the first control program stored in the first memory 112 to function as the projection control section 113, the first acquisition section 114, the second acquisition section 115, and the evaluation section 116.

The projection control section 113 causes the projection state of the first projector 200A at a first timing T1 to differ from the projection states of the second projector 200B and the third projector 200C. The projection state includes the projection-on state and the projection-off state. The projection-on state is a state in which an image is projected, and the projection-off state is a state in which no image is projected.

The projection control section 113 switches the projection state of each of the first projector 200A to the third projector 200C between the projection-on state and the projection-off state.

The first timing T1 will be described with reference to FIGS. 6 and 9 to 12.

The first acquisition section 114 acquires a first image P1 generated by the camera 300 when the camera 300 captures an image of an area containing the screen SC at the first timing T1.

Specifically, the first acquisition section 114 causes the camera 300 to capture an image of the area containing the screen SC at the first timing T1. The first acquisition section 114 then acquires the first image P1 generated by the camera 300.

The second acquisition section 115 acquires a second image P2 generated by the camera 300 when the camera 300 captures an image of the area containing the screen SC at a second timing T2 different from the first timing T1.

Specifically, the second acquisition section 115 causes the camera 300 to capture an image of the area containing the screen SC at the second timing T2. The first acquisition section 114 then acquires the second image P2 generated by the camera 300.

The second timing T2 will be described with reference to FIGS. 6 and 9 to 12.

The evaluation section 116 determines that the first projector 200A needs to be adjusted when the difference in color value between the first image P1 and the second image P2 is greater than or equal to a threshold. When the difference in color value between the first image P1 and the second image P2 is equal to or greater than the threshold, the evaluation section 116 determines, for example, that the color of the image projected by the first projector 200A needs to be adjusted.

The color value is, for example, a value representing "hue," which is one of the three attributes of color. The three attributes of color are formed of hue, brightness, and saturation.

The difference in color value between the first image P1 and the second image P2 is calculated as follows: First, a predetermined number of pixels that are two or more pixels that form the first image P1 are determined. The predetermined number is, for example, ten. The predetermined number of pixels that form the second image P2 are then so determined that the in-image positions of the pixels correspond to the in-image positions of the predetermined number of pixels that form the first image P1. The color values of the predetermined number of pixels that form the first image P1 and the color values of the predetermined number of pixels that form the second image P2 are then acquired. The differences in color value between the predetermined number of pixels that form the first image P1 and the predetermined number of pixels that form the second image P2 and correspond to the predetermined number of pixels that form the first image P1 in terms of in-image position are then calculated, and the average of the differences in color value is calculated. As a result, the difference in color value between the first image P1 and the second image P2 is calculated.

First Embodiment

Processes carried out by the first control section 110 according to the first embodiment will next be described with reference to FIGS. 6 to 8.

Figure 6:
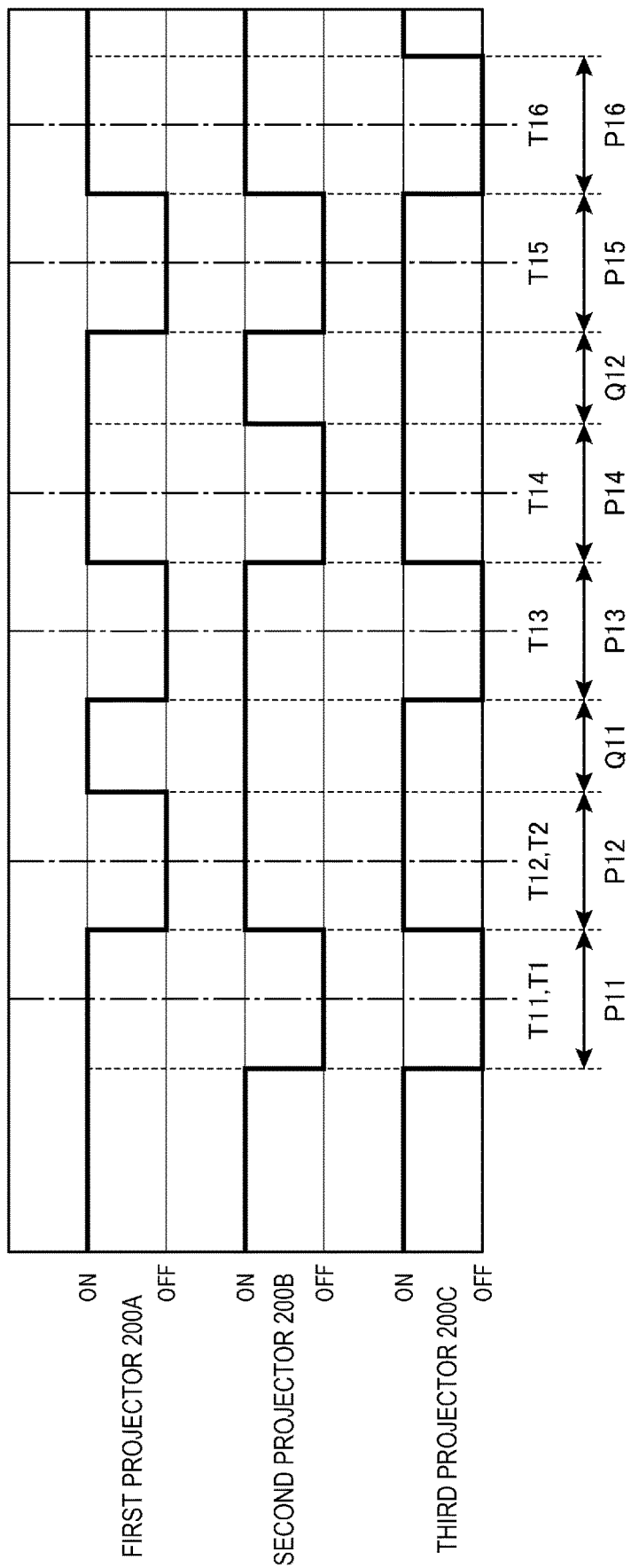
FIG. 6 is a timing chart showing an example of changes in a projection state in the first embodiment.

FIG. 6 is a timing chart showing an example of changes in the projection state in the first embodiment. The horizontal axis of FIG. 6 represents time, and the vertical axis of FIG. 6 represents the states of the first projector 200A to the third projector 200C. "ON" represents the projection-on state, and "OFF" represents the projection-off state.

The projection control section 113 of the first control section 110 switches the projection state of each of the first projector 200A to the third projector 200C between the projection-on state and the projection-off state, as will be described below with reference to FIG. 6.

In a period P11, the first projector 200A operates in the projection-on state, and the second projector 200B and the third projector 200C each operate in the projection-off state.

In a period P12, the first projector 200A operates in the projection-off state, and the second projector 200B and the third projector 200C each operate in the projection-on state.

A timing T11 represents the timing at the center of the period P11, and a timing T12 represents the timing at the center of the period P12. The first acquisition section 114 acquires the first image P1 at the timing T11. The second acquisition section 115 acquires the second image P2 at the timing T12.

The timing T11 corresponds to an example of the first timing T1, and the timing T12 corresponds to an example of the second timing T2.

In the present embodiment, the timing T11 represents the timing at the center of the period P11, and the timing T12 represents the timing at the center of the period P12, but not necessarily. The timing T11 only needs to be any timing within the period P11. The timing T12 only needs to be any timing within the period P12.

The evaluation section 116 determines that the first projector 200A needs to be adjusted when the difference in color value between the first image P1 acquired at the timing T11 and the second image P2 acquired at the timing T12 is greater than or equal to the threshold.

In a period Q11, the first projector 200A to the third projector 200C each operate in the projection-on state.

In a period P13, the first projector 200A and the third projector 200C each operate in the projection-off state, and the second projector 200B operates in the projection-on state.

In a period P14, the first projector 200A and the third projector 200C each operate in the projection-on state, and the second projector 200B operates in the projection-off state.

A timing T13 represents the timing at the center of the period P13, and a timing T14 represents the timing at the center of the period P14. The first acquisition section 114 acquires the first image P1 at the timing T13. The second acquisition section 115 acquires the second image P2 at the timing T14.

The evaluation section 116 determines that the second projector 200B needs to be adjusted when the difference in color value between the first image P1 acquired at the timing T13 and the second image P2 acquired at the timing T14 is greater than or equal to the threshold.

In a period Q12, the first projector 200A to the third projector 200C each operate in the projection-on state.

In a period P15, the first projector 200A and the second projector 200B each operate in the projection-off state, and the third projector 200C operates in the projection-on state.

In a period P16, the first projector 200A and the second projector 200B each operate in the projection-on state, and the third projector 200C operates in the projection-off state.

A timing T15 represents the timing at the center of the period P15, and a timing T16 represents the timing at the center of the period P16. The first acquisition section 114 acquires the first image P1 at the timing T15. The second acquisition section 115 acquires the second image P2 at the timing T16.

The evaluation section 116 determines that the third projector 200C needs to be adjusted when the difference in color value between the first image P1 acquired at the timing T15 and the second image P2 acquired at the timing T16 is greater than or equal to the threshold.

Figure 7:
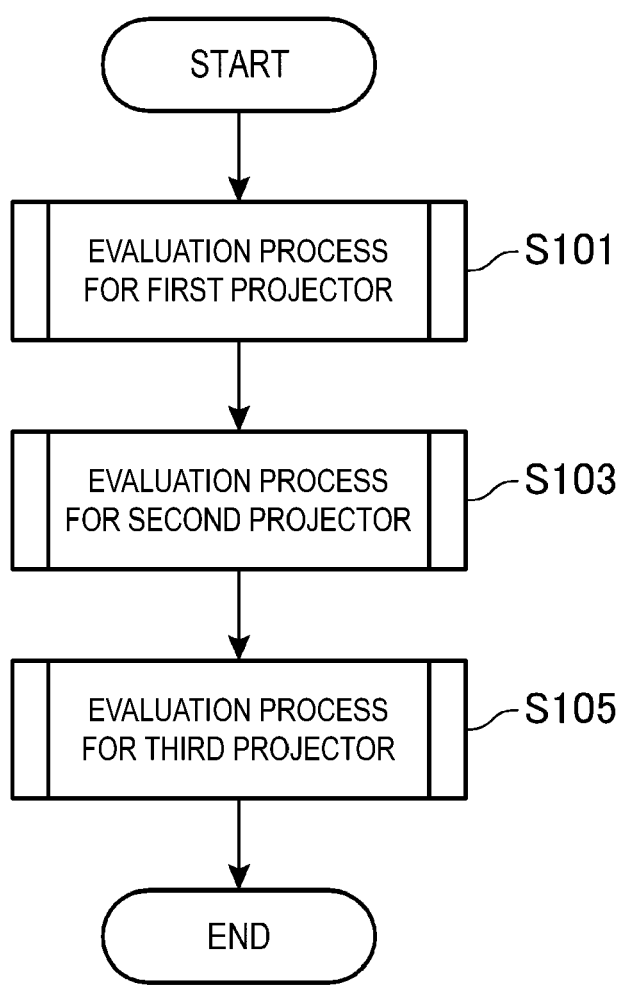
FIG. 7 is a flowchart showing an example of the overall process carried out by the first control section.

FIG. 7 is a flowchart showing an example of the overall process carried out by the first control section 110.

In step S101, the first control section 110 carries out an evaluation process for the first projector 200A.

In step S103, the first control section 110 carries out the evaluation process for the second projector 200B.

In step S105, the first control section 110 carries out the evaluation process for the third projector 200C, and the entire process then ends.

The "evaluation process" is the process of evaluating whether or not the first projector 200A to the third projector 200C each need to be adjusted.

The "evaluation process" will be described with reference to FIG. 8.

Figure 8:
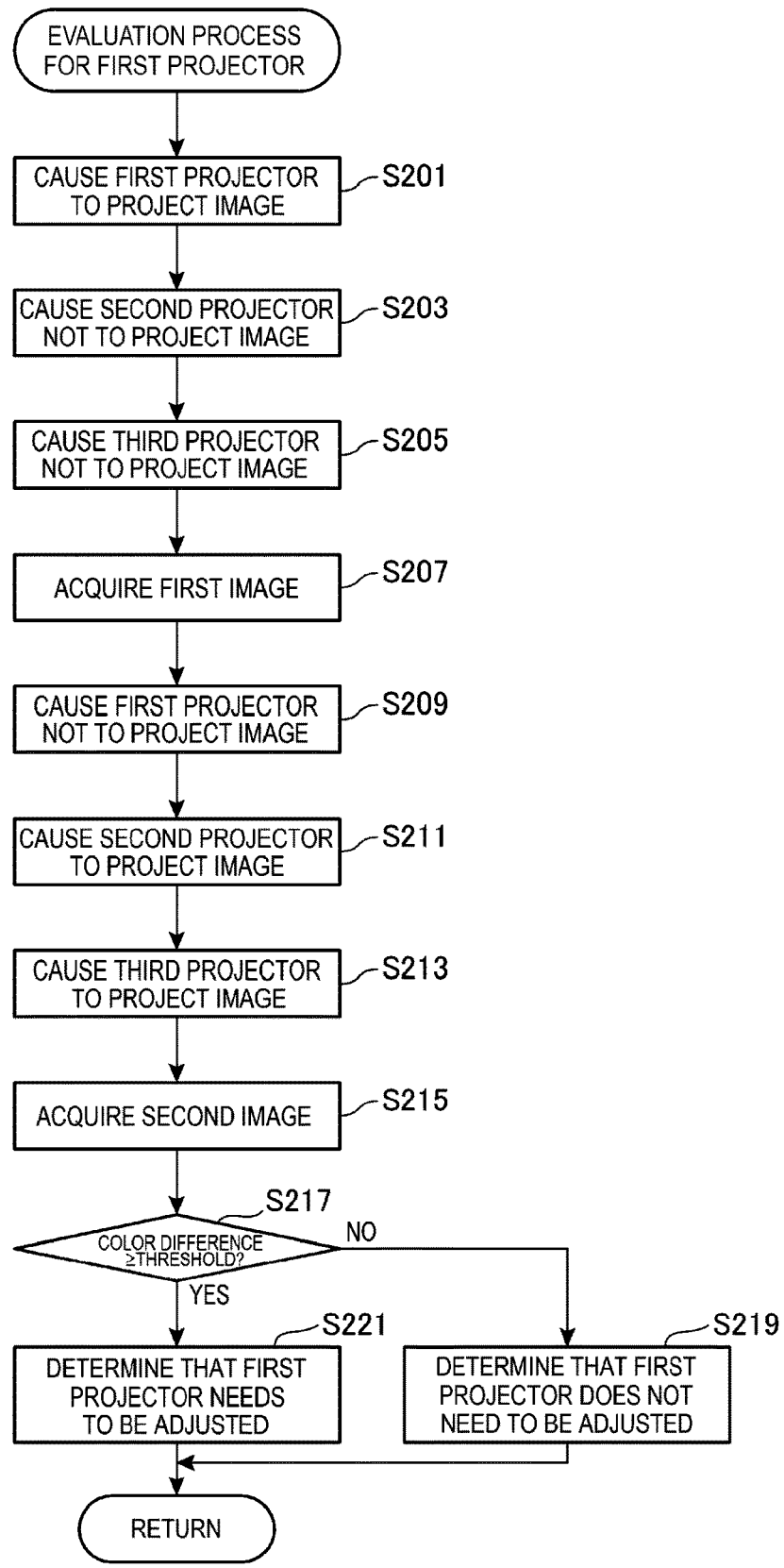
FIG. 8 is a flowchart showing an example of an evaluation process carried out by the first control section.

FIG. 8 is a flowchart showing an example of the evaluation process carried out by the first control section 110. FIG. 8 shows, as an example of the "evaluation process", the evaluation process for the first projector 200A carried out in step S101 of FIG. 7.

First, in step S201, the projection control section 113 causes the first projector 200A to operate in the projection-on state.

Thereafter, in step S203, the projection control section 113 causes the second projector 200B to operate in the projection-off state.

Thereafter, in step S205, the projection control section 113 causes the third projector 200C to operate in the projection-off state.

Thereafter, in step S207, the first acquisition section 114 causes the camera 300 to capture an image of the area containing the screen SC to acquire a generated first image P1.

Thereafter, in step S209, the projection control section 113 causes the first projector 200A to operate in the projection-off state.

Thereafter, in step S211 the projection control section 113 causes the second projector 200B to operate in the projection-on state.

Thereafter, in step S213, the projection control section 113 causes the third projector 200C to operate in the projection-on state.

Thereafter, in step S215, the second acquisition section 115 causes the camera 300 to capture an image of the area containing the screen SC to acquire a generated second image P2.

Thereafter, in step S217, the evaluation section 116 calculates the difference in color value between the first image P1 and the second image P2 and evaluates whether or not the difference in color value is greater than or equal to the threshold.

When the evaluation section 116 determines that the difference in color value is not greater than or equal to the threshold (NO in step S217), the control proceeds to the process in step S219.

Thereafter, in step S219, the evaluation section 116 determines that the first projector 200A does not need to be adjusted, and the entire process then ends.

When the evaluation section 116 determines that the difference in color value is greater than or equal to the threshold (YES in step S217), the control proceeds to the process in step S221.

Thereafter, in step S221, the evaluation section 116 determines that the first projector 200A needs to be adjusted, and then the entire process ends.

In FIG. 8, the evaluation process for the first projector 200A is shown as an example of the "evaluation process," and the evaluation process for the second projector 200B and the evaluation process for the third projector 200C are each also the same as that in FIG. 8.

The evaluation process for the second projector 200B differs from that in the flowchart shown in FIG. 8 in terms of points below.

As shown in the period P13 in FIG. 6, the projection control section 113 causes each of the first projector 200A and the third projector 200C to operate in the projection-off state and causes the second projector 200B to operate in the projection-on state. The first acquisition section 114 then causes the camera 300 to capture an image of the area containing the screen SC to acquire a generated first image P1.

Further, as shown in the period P14 in FIG. 6, the projection control section 113 causes the first projector 200A and the third projector 200C to each operate in the projection-on state and causes the second projector 200B to operate in the projection-off state. The second acquisition section 115 then causes the camera 300 to capture an image of the area containing the screen SC to acquire a generated second image P2.

The evaluation process for the third projector 200C differs from that in the flowchart shown in FIG. 8 in terms of points below.

In the evaluation process for the third projector 200C, the projection control section 113 causes the first projector 200A and the second projector 200B to each operate in the projection-off state and causes the third projector 200C to operate in the projection-on state, as shown in the period P15 in FIG. 6. The first acquisition section 114 then causes the camera 300 to capture an image of the area containing the screen SC to acquire a generated first image P1.

Further, the projection control section 113 causes the first projector 200A and the second projector 200B to each operate in the projection-on state and causes the third projector 200C to operate in the projection-off state, as shown in the period P16 in FIG. 6. The second acquisition section 115 then causes the camera 300 to capture an image of the area containing the screen SC to acquire a generated second image P2.

As described with reference to FIGS. 6 to 8, the first image P1 and the second image P2 allow evaluation of whether or not the first projector 200A to the third projector 200C each needs to be adjusted.

Second Embodiment

The processes carried out by the first control section 110 according to a second embodiment will next be described with reference to FIG. 9.

Figure 9:
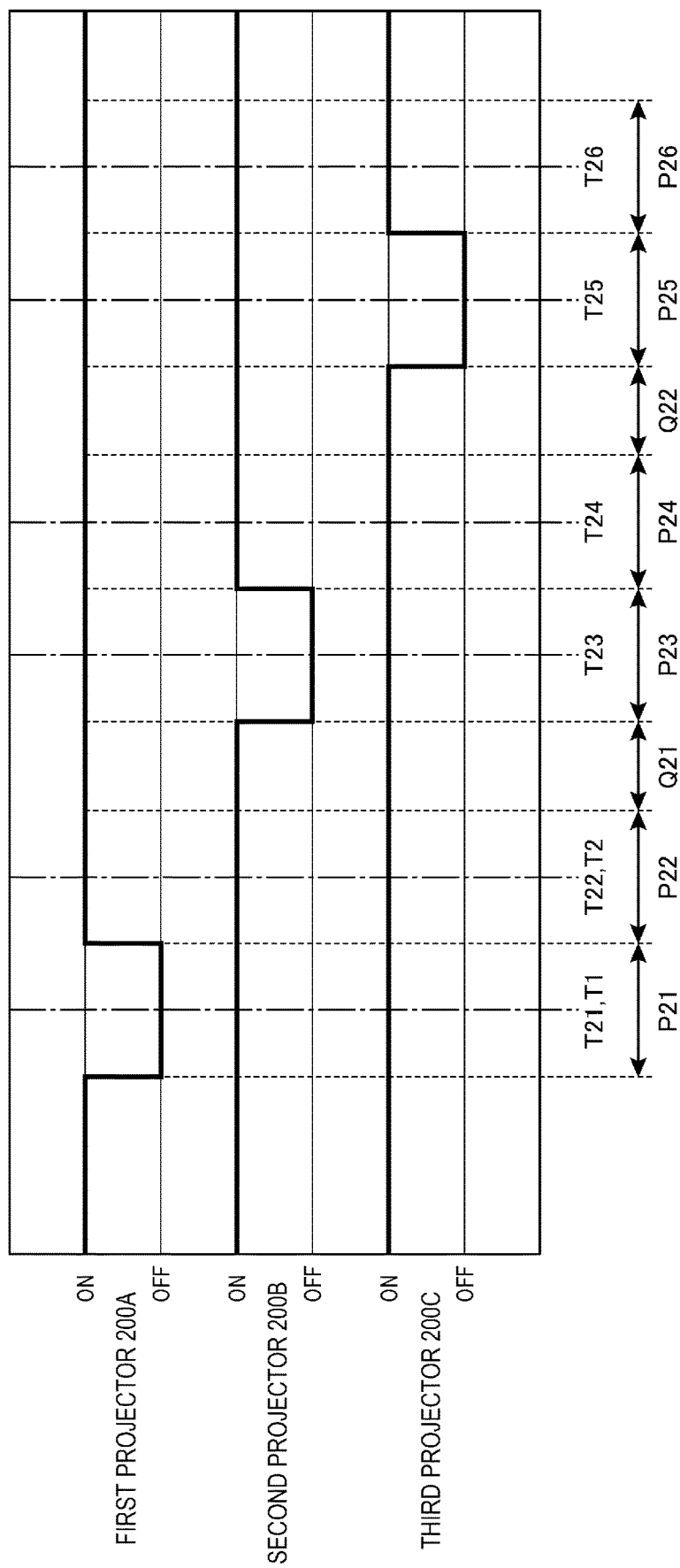
FIG. 9 is a timing chart showing an example of changes in the projection state in a second embodiment.

FIG. 9 is a timing chart showing an example of changes in the projection state in the second embodiment. The vertical and horizontal axes of FIG. 9 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 9.

In a period P21, the first projector 200A operates in the projection-off state, and the second projector 200B and the third projector 200C each operate in the projection-on state.

In a period P22, the first projector 200A to the third projector 200C each operate in the projection-on state.

A timing T21 represents the timing at the center of the period P21, and a timing T22 represents the timing at the center of the period P22. The first acquisition section 114 acquires the first image P1 at the timing T21. The second acquisition section 115 acquires the second image P2 at the timing T22.

The timing T21 corresponds to an example of the first timing T1, and the timing T22 corresponds to an example of the second timing T2.

The evaluation section 116 determines that the first projector 200A needs to be adjusted when the difference in color value between the first image P1 acquired at the timing T21 and the second image P2 acquired at the timing T22 is greater than or equal to the threshold.

In a period Q21, the first projector 200A to the third projector 200C each operate in the projection-on state.

In a period P23, the second projector 200B operates in the projection-off state, and the first projector 200A and the third projector 200C each operate in the projection-on state.

In a period P24, the first projector 200A to the third projector 200C each operate in the projection-on state.

A timing T23 represents the timing at the center of the period P23, and a timing T24 represents the timing at the center of the period P24. The first acquisition section 114 acquires the first image P1 at the timing T23. The second acquisition section 115 acquires the second image P2 at the timing T24.

The evaluation section 116 determines that the second projector 200B needs to be adjusted when the difference in color value between the first image P1 acquired at the timing T23 and the second image P2 acquired at the timing T24 is greater than or equal to the threshold.

In a period Q22, the first projector 200A to the third projector 200C each operate in the projection-on state.

In a period P25, the third projector 200C operates in the projection-off state, and the first projector 200A and the second projector 200B each operate in the projection-on state.

In a period P26, the first projector 200A to the third projector 200C each operate in the projection-on state.

A timing T25 represents the timing at the center of the period P25, and a timing T26 represents the timing at the center of the period P26. The first acquisition section 114 acquires the first image P1 at the timing T25. The second acquisition section 115 acquires the second image P2 at the timing T26.

The evaluation section 116 determines that the third projector 200C needs to be adjusted when the difference in color value between the first image P1 acquired at the timing T25 and the second image P2 acquired at the timing T26 is greater than or equal to the threshold.

As described with reference to FIG. 9, the first image P1 and the second image P2 allow evaluation of whether or not the first projector 200A to the third projector 200C each needs to be adjusted.

Third Embodiment

The processes carried out by the first control section 110 according to a third embodiment will next be described with reference to FIG. 10.

Figure 10:
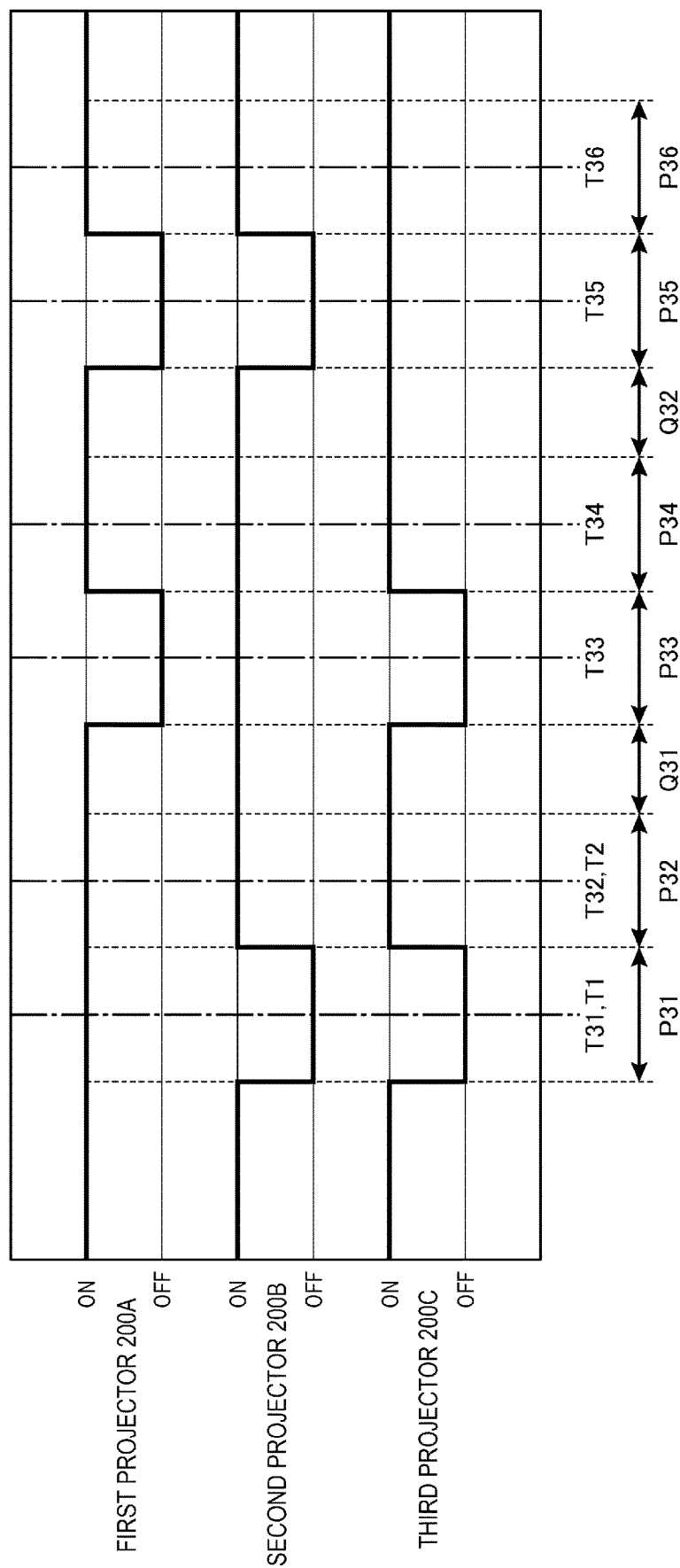
FIG. 10 is a timing chart showing an example of changes in the projection state in a third embodiment.

FIG. 10 is a timing chart showing an example of changes in the projection state in the third embodiment. The vertical and horizontal axes of FIG. 10 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 10.

In a period P31, the first projector 200A operates in the projection-on state, and the second projector 200B and the third projector 200C each operate in the projection-off state.

In a period P32, the first projector 200A to the third projector 200C each operate in the projection-on state.

A timing T31 represents the timing at the center of the period P31, and a timing T32 represents the timing at the center of the period P32. The first acquisition section 114 acquires the first image P1 at the timing T31. The second acquisition section 115 acquires the second image P2 at the timing T32.

The timing T31 corresponds to an example of the first timing T1, and the timing T32 corresponds to an example of the second timing T2.

The evaluation section 116 determines that the first projector 200A needs to be adjusted when the difference in color value between the first image P1 acquired at the timing T31 and the second image P2 acquired at the timing T32 is greater than or equal to the threshold.

In a period Q31, the first projector 200A to the third projector 200C each operate in the projection-on state.

In a period P33, the second projector 200B operates in the projection-on state, and the first projector 200A and the third projector 200C each operate in the projection-off state.

In a period P34, the first projector 200A to the third projector 200C each operate in the projection-on state.

A timing T33 represents the timing at the center of the period P33, and a timing T34 represents the timing at the center of the period P34. The first acquisition section 114 acquires the first image P1 at the timing T33. The second acquisition section 115 acquires the second image P2 at the timing T34.

The evaluation section 116 determines that the second projector 200B needs to be adjusted when the difference in color value between the first image P1 acquired at the timing T33 and the second image P2 acquired at the timing T34 is greater than or equal to the threshold.

In a period Q32, the first projector 200A to the third projector 200C each operate in the projection-on state.

In a period P35, the third projector 200C operates in the projection-on state, and the first projector 200A and the second projector 200B each operate in the projection-off state.

In a period P36, the first projector 200A to the third projector 200C each operate in the projection-on state.

A timing T35 represents the timing at the center of the period P35, and a timing T36 represents the timing at the center of the period P36. The first acquisition section 114 acquires the first image P1 at the timing T35. The second acquisition section 115 acquires the second image P2 at the timing T36.

The evaluation section 116 determines that the third projector 200C needs to be adjusted when the difference in color value between the first image P1 acquired at the timing T35 and the second image P2 acquired at the timing T36 is greater than or equal to the threshold.

As described with reference to FIG. 10, the first image P1 and the second image P2 allow evaluation of whether or not the first projector 200A to the third projector 200C each needs to be adjusted.

Fourth Embodiment

The processes carried out by the first control section 110 according to a fourth embodiment will next be described with reference to FIG. 11.

FIG. 11 is a timing chart showing an example of changes in the projection state in the fourth embodiment. The vertical and horizontal axes of FIG. 11 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 11.

In a period P41, the first projector 200A operates in the projection-off state, and the second projector 200B and the third projector 200C each operate in the projection-on state.

In a period P42, the first projector 200A operates in the projection-on state, and the second projector 200B and the third projector 200C each operate in the projection-off state.

In a period P43, the first projector 200A operates in the projection-off state, and the second projector 200B and the third projector 200C each operate in the projection-on state.

A timing T41 represents the timing at the center of the period P41, a timing T42 represents the timing at the center of the period P42, and a timing T43 represents the timing at the center of the period P43. The first acquisition section 114 acquires the first image P1 at the timing T42. The second acquisition section 115 acquires the second image P2 at the timings T41 and T43.

The timing T42 corresponds to an example of the first timing T1, and the timings T41 and T43 correspond to examples of the second timing T2.

The evaluation section 116 determines that the first projector 200A needs to be adjusted when the difference in color value between the first image P1 acquired at the timing T42 and at least one of the second images P2 acquired at the timings T41 and T43 is greater than or equal to the threshold.

For example, the evaluation section 116 determines that the first projector 200A needs to be adjusted when the difference in color value between the first image P1 acquired at the timing T42 and the second image P2 acquired at the timing T41 is greater than or equal to the threshold. Further, the evaluation section 116 determines that the first projector 200A needs to be adjusted when the difference in color value between the first image P1 acquired at the timing T42 and the second image P2 acquired at the timing T43 is greater than or equal to the threshold.

In a period Q41, the first projector 200A to the third projector 200C each operate in the projection-on state.

In a period P44, the second projector 200B operates in the projection-off state, and the first projector 200A and the third projector 200C each operate in the projection-on state.

In a period P45, the second projector 200B operates in the projection-on state, and the first projector 200A and the third projector 200C each operate in the projection-off state.

In a period P46, the second projector 200B operates in the projection-off state, and the first projector 200A and the third projector 200C each operate in the projection-on state.

A timing T44 represents the timing at the center of the period P44, a timing T45 represents the timing at the center of the period P45, and a timing T46 represents the timing at the center of the period P46. The first acquisition section 114 acquires the first image P1 at the timing T45. The second acquisition section 115 acquires the second image P2 at the timings T44 and T46.

The evaluation section 116 determines that the second projector 200B needs to be adjusted when the difference in color value between the first image P1 acquired at the timing T45 and at least one of the second images P2 acquired at the timings T44 and T46 is greater than or equal to the threshold.

In a period Q42, the first projector 200A to the third projector 200C each operate in the projection-on state.

In a period P47, the third projector 200C operates in the projection-off state, and the first projector 200A and the second projector 200B each operate in the projection-on state.

In a period P48, the third projector 200C operates in the projection-on state, and the first projector 200A and the second projector 200B each operate in the projection-off state.

In a period P49, the third projector 200C operates in the projection-off state, and the first projector 200A and the second projector 200B each operate in the projection-on state.

A timing T47 represents the timing at the center of the period P47, a timing T48 represents the timing at the center of the period P48, and a timing T49 represents the timing at the center of the period P49. The first acquisition section 114 acquires the first image P1 at the timing T48. The second acquisition section 115 acquires the second image P2 at the timings T47 and T49.

The evaluation section 116 determines that the third projector 200C needs to be adjusted when the difference in color value between the first image P1 acquired at the timings T48 and at least one of the second images P2 acquired at the timings T47 and T49 is greater than or equal to the threshold.

As described with reference to FIG. 11, the first image P1 and the second image P2 allow evaluation of whether or not the first projector 200A to the third projector 200C each need to be adjusted.

Further, for example, to evaluate whether or not the first projector 200A needs to be adjusted, the second image P2 is acquired at the timings T41 and T43 before and after the timing T42 at which the first image P1 is acquired. Whether or not the first projector 200A needs to be adjusted can therefore be further appropriately evaluated.

Fifth Embodiment

The processes carried out by the first control section 110 according to a fifth embodiment will next be described with reference to FIG. 12.

FIG. 12 is a timing chart showing an example of changes in the projection state in the fifth embodiment. The vertical and horizontal axes of FIG. 12 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 12.

In a period P51, the first projector 200A to the third projector 200C each operate in the projection-on state.

In a period P52, the first projector 200A operates in the projection-off state, and the second projector 200B and the third projector 200C each operate in the projection-on state.

In a period P53, the first projector 200A to the third projector 200C each operate in the projection-on state.

A timing T51 represents the timing at the center of the period P51, a timing T52 represents the timing at the center of the period P52, and a timing T53 represents the timing at the center of the period P53. The first acquisition section 114 acquires the first image P1 at the timing T52. The second acquisition section 115 acquires the second image P2 at the timings T51 and T53.

The timing T52 corresponds to an example of the first timing T1, and the timings T51 and T53 correspond to examples of the second timing T2.

The evaluation section 116 determines that the first projector 200A needs to be adjusted when the difference in color value between the first image P1 acquired at the timing T52 and at least one of the second images P2 acquired at the timings T51 and T53 is greater than or equal to the threshold.

For example, the evaluation section 116 determines that the first projector 200A needs to be adjusted when the difference in color value between the first image P1 acquired at the timing T52 and the second image P2 acquired at the timing T51 is greater than or equal to the threshold. Further, the evaluation section 116 determines that the first projector 200A needs to be adjusted when the difference in color value between the first image P1 acquired at the timing T52 and the second image P2 acquired at the timing T53 is greater than or equal to the threshold.

In a period Q51, the first projector 200A to the third projector 200C each operate in the projection-on state.

In a period P54, the first projector 200A to the third projector 200C each operate in the projection-on state.

In a period P55, the second projector 200B operates in the projection-off state, and the first projector 200A and the third projector 200C each operate in the projection-on state.

In a period P56, the first projector 200A to the third projector 200C each operate in the projection-on state.

A timing T54 represents the timing at the center of the period P54, a timing T55 represents the timing at the center of the period P55, and a timing T56 represents the timing at the center of the period P56. The first acquisition section 114 acquires the first image P1 at the timing T55. The second acquisition section 115 acquires the second image P2 at the timings T54 and T56.

The evaluation section 116 determines that the second projector 200B needs to be adjusted when the difference in color value between the first image P1 acquired at the timing T55 and at least one of the second images P2 acquired at the timings T54 and T56 is greater than or equal to the threshold.

In a period Q52, the first projector 200A to the third projector 200C each operate in the projection-on state.

In a period P57, the first projector 200A to the third projector 200C each operate in the projection-on state.

In a period P58, the third projector 200C operates in the projection-off state, and the first projector 200A and the second projector 200B each operate in the projection-on state.

In a period P59, the first projector 200A to the third projector 200C each operate in the projection-on state.

A timing T57 represents the timing at the center of the period P57, a timing T58 represents the timing at the center of the period P58, and a timing T59 represents the timing at the center of the period P59. The first acquisition section 114 acquires the first image P1 at the timing T58. The second acquisition section 115 acquires the second image P2 at the timings T57 and T59.

The evaluation section 116 determines that the third projector 200C needs to be adjusted when the difference in color value between the first image P1 acquired at the timing T58 and at least one of the second images P2 acquired at the timings T57 and T59 is greater than or equal to the threshold.

As described with reference to FIG. 12, the first image P1 and the second image P2 allow evaluation of whether or not the first projector 200A to the third projector 200C each need to be adjusted.

Further, for example, to evaluate whether or not the first projector 200A needs to be adjusted, the second image P2 is acquired at the timings T51 and T53 before and after the timing T52 at which the first image P1 is acquired. Whether or not the first projector 200A needs to be adjusted can therefore be further appropriately evaluated.

Present Embodiment and Effects and Advantages

As described above with reference to FIGS. 1 to 12, the evaluation method for the image projection system 1 according to the present embodiment is the evaluation method for the image projection system 1, in which the first projector 200A, the second projector 200B, and the third projector 200C perform the stack projection to project images on the screen SC, and includes acquiring the first image P1 generated by the camera 300 when the camera 300 captures an image of the area containing the screen SC at the first timing T1, acquiring the second image P2 generated by the camera 300 when the camera 300 captures an image of the area containing the screen SC at the second timing T2 different from the first timing T1, causing the projection state of the first projector 200A to differ from the projection states of the second projector 200B and the third projector 200C at the first timing T1, and determining that the first projector 200A needs to be adjusted when the difference in color value between the first image P1 and the second image P2 is greater than or equal to the threshold.

Therefore, when the first projector 200A, the second projector 200B, and the third projector 200C perform the stack projection, whether or not the first projector 200A needs to be adjusted can be evaluated.

Further, as described with reference to FIG. 6, the first projector 200A is caused not to project an image, and the second projector 200B and the third projector 200C are each caused to project an image at the first timing T1, whereas the first projector 200A is caused to project an image, and the second projector 200B and the third projector 200C are each caused not to project an image at the second timing T2.

The projection state of the first projector 200A can therefore be made different from the projection states of the second projector 200B and the third projector 200C at the first timing T1. Whether or not the first projector 200A needs to be adjusted can therefore be evaluated.

Further, as described with reference to FIG. 9, the first projector 200A is caused not to project an image, and the second projector 200B and the third projector 200C are each caused to project an image at the first timing T1, whereas the first projector 200A, the second projector 200B, and the third projector 200C are each caused to project an image at the second timing T2.

The projection state of the first projector 200A can therefore be made different from the projection states of the second projector 200B and the third projector 200C at the first timing T1. Whether or not the first projector 200A needs to be adjusted can therefore be evaluated.

Further, as described with reference to FIG. 10, the first projector 200A is caused to project an image, and the second projector 200B and the third projector 200C are each caused not to project an image at the first timing T1, whereas the first projector 200A, the second projector 200B, and the third projector 200C are each caused to project an image at the second timing T2.

The projection state of the first projector 200A can therefore be made different from the projection states of the second projector 200B and the third projector 200C at the first timing T1. Whether or not the first projector 200A needs to be adjusted can therefore be evaluated.

The image projection system 1 according to the present embodiment is the image projection system 1 including the first projector 200A, the second projector 200B, and the third projector 200C, which perform the stack projection to project images on the screen SC, and the camera 300, which captures an image of the area containing the screen SC, and further includes the first acquisition section 114, which acquires the first image P1 generated by the camera 300 when the camera 300 captures an image of the area containing the screen SC at the first timing T1, the second acquisition section 115, which acquires the second image P2 generated by the camera 300 when the camera 300 captures an image of the area containing the screen SC at the second timing T2 different from the first timing T1, the projection control section 113, which causes the projection state of the first projector 200A to differ from the projection states of the second projector 200B and the third projector 200C at the first timing T1, and the evaluation section 116, which determines that the first projector 200A needs to be adjusted when the difference in color value between the first image P1 and the second image P2 is greater than or equal to the threshold.

Therefore, when the first projector 200A, the second projector 200B, and the third projector 200C perform the stack projection, whether or not the first projector 200A needs to be adjusted can be evaluated.

The control apparatus 100 according to the present embodiment is the control apparatus 100 communicably connected to the first projector 200A, the second projector 200B, and the third projector 200C, which perform the stack projection to project images on the screen SC, and the camera 300, which captures an image of the area containing the screen SC and includes the first acquisition section 114, which acquires the first image P1 generated by the camera 300 when the camera 300 captures an image of the area containing the screen SC at the first timing T1, the second acquisition section 115, which acquires the second image P2 generated by the camera 300 when the camera 300 captures an image of the area containing the screen SC at the second timing T2 different from the first timing T1, the projection control section 113, which causes the projection state of the first projector 200A to differ from the projection states of the second projector 200B and the third projector 200C at the first timing T1, and the evaluation section 116, which determines that the first projector 200A needs to be adjusted when the difference in color value between the first image P1 and the second image P2 is greater than or equal to the threshold.

Therefore, when the first projector 200A, the second projector 200B, and the third projector 200C perform the stack projection, whether or not the first projector 200A needs to be adjusted can be evaluated.

6. Other Embodiments

The present embodiment described above is a preferable embodiment. The present disclosure is, however, not limited to the embodiment described above, and a variety of variations are conceivable to the extent that the variations do not depart from the substance of the present disclosure.

In the present embodiment, the case where the number of projectors 200 that perform the stack projection is three has been described in detail with reference to FIGS. 1 to 12, but not necessarily. The number of projectors 200 that perform the stack projection may be four or more.

In the present embodiment, the first control section 110 of the control apparatus 100 includes the projection control section 113, the first acquisition section 114, the second acquisition section 115, and the evaluation section 116, but not necessarily. Any one of the plurality of projectors 200, which form the image projection system 1, may include the projection control section 113, the first acquisition section 114, the second acquisition section 115, and the evaluation section 116. In this case, the image projection system 1 does not need to include the control apparatus 100.

In the present embodiment, the projected images are each a pattern image, but not necessarily. The projected images may each be an image generated by the control apparatus 100 that reproduces a content.

The present embodiment has been described with reference to the case where the control apparatus 100 is formed of a personal computer, but not necessarily. The control apparatus 100 may instead be formed, for example, of a tablet terminal, a smartphone, or a PDA (personal digital assistant).

Further, the present embodiment has been described with reference to the case where the control apparatus 100 is communicably connected to the projectors 200 via a LAN, but not necessarily. The control apparatus 100 may be communicably connected to the projectors 200 by using wireless communication, such as Wi-Fi (registered trademark).

The functional portions shown in FIGS. 3 to 5 each represent a functional configuration and are each not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware in the embodiment described above may be achieved by software. In addition, the specific detailed configuration of each of the other portions in the control apparatus 100 can be arbitrarily changed to the extent that the change does not depart from the substance of the present disclosure.

The process units in the flowcharts shown in FIGS. 7 and 8 are process units divided in accordance with the contents of primary processes for easy understanding of the processes carried out by the control apparatus 100. The present disclosure is not limited by how to produce the divided process units or the names of the process units in the flowcharts shown in FIGS. 7 and 8. A process carried out by the control apparatus 100 can each be further divided into a larger number of process units in accordance with the content of the process, and each of the process units can further be divided into a large number of processes. Further, the order in which the processes are carried out in the flowcharts described above is not limited to that shown in FIGS. 7 and 8.

Further, the evaluation method for the image projection system 1 can be achieved by causing the first processor 111 provided in the control apparatus 100 to execute the first control program corresponding to the evaluation method for the image projection system 1. The first control program can also be recorded on a computer readable recording medium. The recording medium can be a magnetic or optical recording medium or a semiconductor memory device. Specific examples of the recording medium may include a flexible disk, an HDD, a CD-ROM (compact disk read only memory), a DVD, a Blu-ray (registered trademark) Disc, a magneto-optical disk, a flash memory, and a portable or immobile recording medium, such as a card-shaped recording medium. The recording medium may instead be a RAM, a ROM, an HDD, or any other nonvolatile storage apparatus that is an internal storage apparatus provided in an image processing apparatus. Further, the evaluation method for the image projection system 1 can be achieved by causing a server apparatus or any other apparatus to store the first control program corresponding to the evaluation method for the image projection system 1 and downloading the first control program from the server apparatus to the control apparatus 100.

What is claimed is:

1. An evaluation method for an image projection system comprising:
   acquiring a first image generated by capturing a projection area at a first timing;
   acquiring a second image generated by capturing the projection area at a second timing different from the first timing;
   causing a projection state of a first projector to differ from projection states of a second projector and a third projector at the first timing; and
   evaluating whether or not the first projector needs to be adjusted based on the first image and the second image, wherein
   the first projector, the second projector, and the third projector perform stack projection in the projection area,
   at least one of the first image and the second image is generated when at least two projectors of the first projector, the second projector and the third projector are projecting an image on the projection area, and
   the image projected by one of the at least two projectors and the image projected by the other of the at least two projectors completely overlap each other on the projection area.

2. The evaluation method for an image projection system according to claim 1, further comprising:
   determining that the first projector needs to be adjusted when a difference in color value between the first image and the second image is greater than or equal to a threshold.

3. The evaluation method for an image projection system according to claim 1, wherein the first projector is caused not to project the image and the second projector and the third projector are each caused to project the image at the first timing, and the first projector is caused to project the image and the second projector and the third projector are each caused not to project the image at the second timing.

4. The evaluation method for an image projection system according to claim 1, wherein the first projector is caused not to project the image and the second projector and the third projector are each caused to project the image at the first timing, and the first projector, the second projector, and the third projector are each caused to project the image at the second timing.

5. The evaluation method for an image projection system according to claim 1, wherein the first projector is caused to project the image and the second projector and the third projector are each caused not to project the image at the first timing, and the first projector, the second projector, and the third projector are each caused to project the image at the second timing.

6. An image projection system comprising:

a first projector, a second projector, and a third projector that perform stack projection in a projection area;

a camera; and one or more processors programmed to:
acquire a first image generated by the camera that captures the projection area at a first timing;
acquire a second image generated by the camera that captures the projection area at a second timing different from the first timing;
cause a projection state of the first projector to differ from projection states of the second projector and the third projector at the first timing; and
evaluate whether or not the first projector needs to be adjusted based on the first image and the second image, wherein at least one of the first image and the second image is generated when at least two projectors of the first projector, the second projector and the third projector are projecting an image on the projection area, and the image projected by one of the at least two projectors and the image projected by the other of the at least two projectors completely overlap each other on the projection area.

7. An image projection control apparatus comprising:

one or more processors programmed to:
acquire a first image generated by a camera that captures a projection area at a first timing;
acquire a second image generated by the camera that captures the projection area at a second timing different from the first timing;
cause a projection state of a first projector to differ from projection states of a second projector and a third projector at the first timing; and
evaluate whether or not the first projector needs to be adjusted based on the first image and the second image, wherein the image projection control apparatus communicably connected to the first projector, the second projector, the third projector, and the camera, and the first projector, the second projector and the third projector perform stack projection in the projection area, at least one of the first image and the second image is generated when at least two projectors of the first projector, the second projector and the third projector are projecting an image on the projection area, and the image projected by one of the at least two projectors and the image projected by the other of the at least two projectors completely overlap each other on the projection area.

* * * * *